United States Patent
Mizumoto et al.

(10) Patent No.: US 11,177,490 B2
(45) Date of Patent: Nov. 16, 2021

(54) FUEL CELL SYSTEM AND CONTROL METHOD THEREOF

(71) Applicant: HONDA MOTOR CO., LTD., Tokyo (JP)

(72) Inventors: Kazuya Mizumoto, Wako (JP); Koichi Kato, Wako (JP); Yoichiro Saito, Mito (JP)

(73) Assignee: HONDA MOTOR CO., LTD., Tokyo (JP)

( * ) Notice: Subject to any disclaimer, the term of this patent is extended or adjusted under 35 U.S.C. 154(b) by 138 days.

(21) Appl. No.: 16/356,041

(22) Filed: Mar. 18, 2019

(65) Prior Publication Data
US 2019/0296376 A1    Sep. 26, 2019

(30) Foreign Application Priority Data
Mar. 22, 2018  (JP) .............................. JP2018-054263

(51) Int. Cl.
*H01M 8/04082*  (2016.01)
*H01M 8/04746*  (2016.01)
*H01M 8/04089*  (2016.01)

(52) U.S. Cl.
CPC ... *H01M 8/04201* (2013.01); *H01M 8/04097* (2013.01); *H01M 8/04753* (2013.01)

(58) Field of Classification Search
None
See application file for complete search history.

(56) References Cited

U.S. PATENT DOCUMENTS

2013/0309590 A1*  11/2013  Furusawa ......... H01M 8/04225
                                                    429/446

FOREIGN PATENT DOCUMENTS

JP          2011-179333         9/2011

* cited by examiner

*Primary Examiner* — Carmen V Lyles-Irving
(74) *Attorney, Agent, or Firm* — Amin, Turocy & Watson, LLP

(57) ABSTRACT

A fuel cell system includes a nozzle for guiding a fuel gas injected from a first injector and a second injector to a diffuser. An injector control portion performs a first injection control mode when a fuel cell stack is in a first load state. When the fuel cell stack is in a second load state, the injector control portion switches between a second injection control mode and a third injection control mode depending on the circumstances.

8 Claims, 7 Drawing Sheets

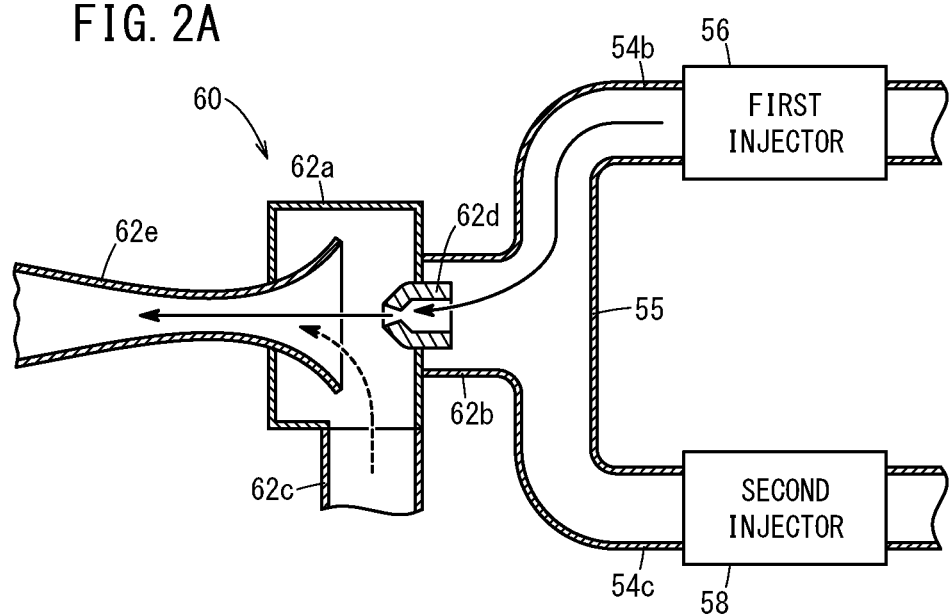
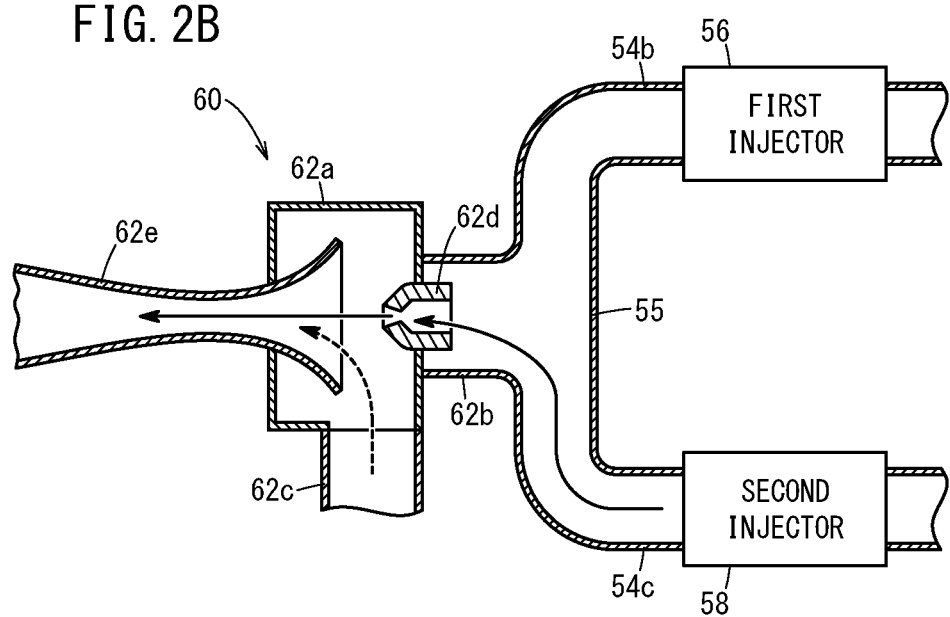

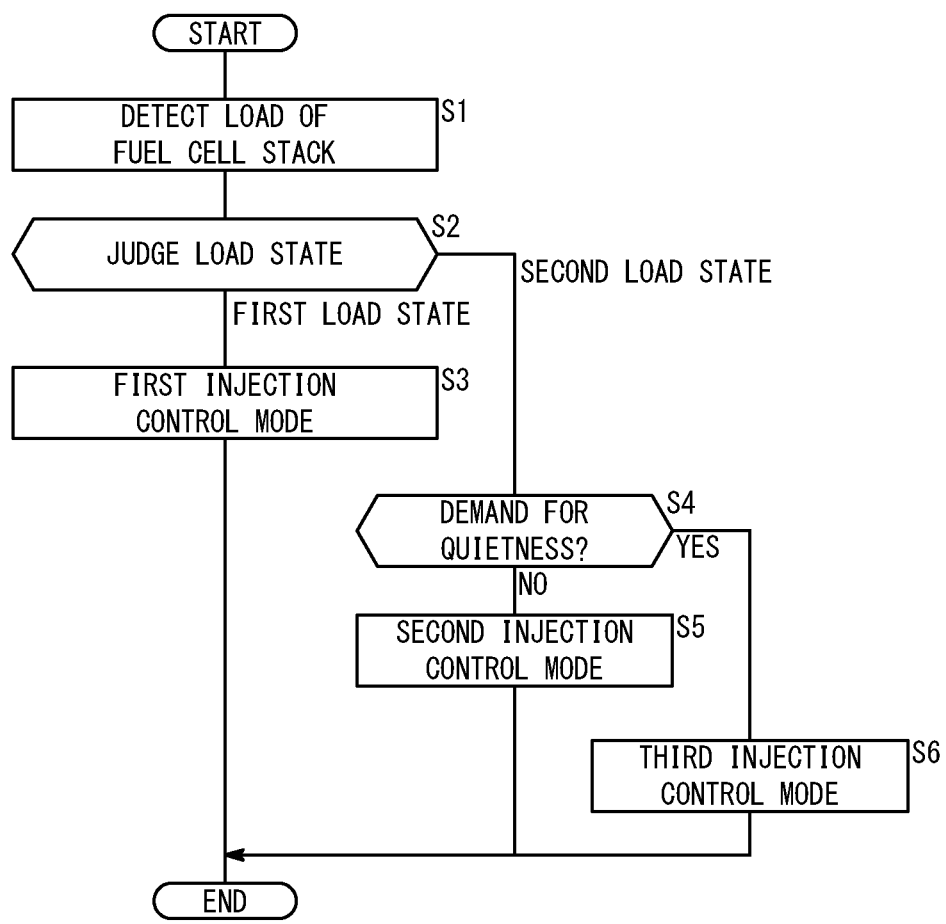

FUEL CELL SYSTEM AND CONTROL METHOD THEREOF

CROSS-REFERENCE TO RELATED APPLICATION

This application is based upon and claims the benefit of priority from Japanese Patent Application No. 2018-054263 filed on Mar. 22, 2018, the contents of which are incorporated herein by reference.

BACKGROUND OF THE INVENTION

Field of the Invention

The present invention relates to a fuel cell system including a plurality of injectors provided in parallel on a fuel gas supply path for guiding a fuel gas to a fuel cell, and to a control method thereof.

Description of the Related Art

Japanese Laid-Open Patent Publication No. 2011-179333 discloses a technical idea for circulating a fuel off-gas discharged from a fuel cell, where two injectors disposed on a fuel gas supply path alternately inject a fuel gas from different directions to a throat portion of a diffuser that constitutes an ejector.

SUMMARY OF THE INVENTION

According to Japanese Laid-Open Patent Publication No. 2011-179333 above, the two injectors alternately inject the fuel gas from different directions to the throat portion of the ejector. Accordingly, the circulation characteristics of the fuel off-gas at the time when one injector injects the fuel gas and the circulation characteristics of the fuel off-gas at the time when the other injector injects the fuel gas differ from each other. It is therefore not easy to stably circulate the fuel off-gas to the fuel cell.

By the way, during power generation of a fuel cell, produced water may accumulate within the fuel cell (in the anode flow field). Such produced water in the fuel cell is drained as a differential pressure of the fuel gas exceeding a certain pressure acts between an inlet and outlet of the fuel cell for a drainage necessary time or longer.

However, in Japanese Laid-Open Patent Publication No. 2011-179333, since the fuel gas is alternately injected from two injectors, it is not always possible to sufficiently raise the pressure pulsation width of the fuel gas. This may lead to a stoichiometric shortage of the fuel gas, or the produced water in the fuel cell may not be drained efficiently.

Further, for a fuel cell system, it is desirable, depending on the circumstances, to suppress noise and vibrations during operation of the injectors.

The present invention has been made considering such problems, and an object of the present invention is to provide a fuel cell system that is capable of circulating a fuel off-gas stably to a fuel cell by a simple control, and that is capable of, depending on the circumstances, enhancing the drainage efficiency of produced water in the fuel cell while preventing a stoichiometric shortage of the fuel gas, and reducing noise and vibrations during operation of the injectors, and to provide a control method thereof.

In order to achieve the object above, a fuel cell system according to the present invention includes: a fuel cell for producing power by an electrochemical reaction between a fuel gas and an oxygen-containing gas; a fuel gas supply path for guiding the fuel gas to the fuel cell; a plurality of injectors disposed in parallel on the fuel gas supply path; one ejector disposed downstream of the plurality of injectors on the fuel gas supply path; and a circulation flow path for guiding a fuel off-gas discharged from the fuel cell to the ejector. The ejector includes: a diffuser; and a nozzle for guiding the fuel gas injected from the plurality of injectors to the diffuser. The fuel cell system includes: a load judge portion configured to judge whether the fuel cell is in a first load state or in a second load state in which a load is higher than in the first load state; and an injector control portion configured to control the plurality of injectors. When the fuel cell is in the first load state, the injector control portion controls the plurality of injectors so as to perform a first injection control mode in which the plurality of injectors intermittently inject the fuel gas in an alternate manner, once at a time or multiple times at a time. When the fuel cell is in the second load state, the injector control portion controls the plurality of injectors in a manner switchable between a second injection control mode in which the injections of the fuel gas from the plurality of injectors are started substantially simultaneously and a third injection control mode in which the injections of the fuel gas from the plurality of injectors are started at shifted points of time.

According to the configuration above, the fuel gas injected from the plurality of injectors is guided to the diffuser through the nozzle of the ejector, so that the circulation characteristics of the fuel off-gas can be kept equal irrespective of from which of the injectors the fuel gas is injected. This makes it possible to stably circulate the fuel off-gas to the fuel cell by a simple control.

Further, when the fuel cell is in the first load state, the first injection control mode is performed in which the plurality of injectors intermittently inject the fuel gas in an alternate manner, once at a time or multiple times at a time. Thus, even in the first load state in which the amount of necessary fuel gas is relatively small, the injection time during which the injectors inject the fuel gas each time can be equal to or longer than a drainage necessary time. This allows the produced water in the fuel cell to be discharged efficiently.

Further, when the fuel cell is in the second load state, the second injection control mode can be performed in which the injections of the fuel gas from the plurality of injectors are started substantially at the same time. In this case, the pressure pulsation width of the fuel gas can be relatively large, so that the differential pressure of the fuel gas between an inlet and outlet of the fuel cell can be effectively raised. This improves drainage efficiency of the produced water in the fuel cell while preventing a stoichiometric shortage of the fuel gas.

Still further, when the fuel cell is in the second load state, the third injection control mode can be performed in which the injections of the fuel gas from the plurality of injectors are started at shifted points of time. In this case, the pressure pulsation width of the fuel gas can be smaller than in the second injection control mode, reducing noise and vibrations during operation of the injectors.

In the fuel cell system above, the injector control portion may be configured to control the plurality of injectors such that, in the first injection control mode, the plurality of injectors intermittently inject the fuel gas in an alternate manner, once at a time.

According to the configuration above, it is possible to suppress variation among the numbers of times that the plurality of injectors inject, so that the lifetimes of the injectors can be equal.

In the fuel cell system above, the injector control portion may be configured to control the plurality of injectors so as to, in the second injection control mode, stop the injections of the fuel gas from the plurality of injectors substantially simultaneously.

According to the configuration above, the time during which the fuel gas is injected simultaneously from the plurality of injectors can be relatively long, which further prevents a stoichiometric shortage of the fuel gas.

In the fuel cell system above, the injector control portion may be configured to control the plurality of injectors so as to, in the third injection control mode, stop the injections of the fuel gas from the plurality of injectors at shifted points of time.

According to the configuration above, it is possible to further suppress noise and vibrations during operation of the injectors.

In the fuel cell system above, the injector control portion may be configured to control the plurality of injectors such that, in the third injection control mode, from before to after a pause time of at least one of the injectors, another of the injectors keeps injecting the fuel gas.

According to the configuration above, it is possible to prevent a stoichiometric shortage of the fuel gas.

In the fuel cell system above, the injector control portion may be configured to control the plurality of injectors such that, in each of the first to third injection control modes, injection times during which each of the injectors injects the fuel gas at one time are substantially equal to each other.

According to the configuration above, it is possible to stably circulate the fuel off-gas to the fuel cell by a further simpler control.

In the fuel cell system above, the plurality of injectors may be structured in a substantially identical manner.

According to the configuration above, it is possible to stably circulate the fuel off-gas to the fuel cell stack by a still simpler control.

A control method of a fuel cell system according to the present invention is a control method of a fuel cell system which includes: a fuel cell for producing power by an electrochemical reaction between a fuel gas and an oxygen-containing gas; a fuel gas supply path for guiding the fuel gas to the fuel cell; a plurality of injectors disposed in parallel on the fuel gas supply path; one ejector disposed downstream of the plurality of injectors on the fuel gas supply path; and a circulation flow path for guiding a fuel off-gas discharged from the fuel cell to the ejector. The ejector includes: a diffuser; and a nozzle for guiding the fuel gas injected from the plurality of injectors to the diffuser. The control method includes: a load judging step of judging whether the fuel cell is in a first load state or in a second load state in which a load is higher than in the first load state; and a fuel gas supply step of supplying the fuel gas to the fuel cell by controlling the plurality of injectors. When the fuel cell is in the first load state, the fuel gas supply step performs a first injection control mode in which the plurality of injectors intermittently inject the fuel gas in an alternate manner, once at a time or multiple times at a time. When the fuel cell is in the second load state, the fuel gas supply step performs a second injection control mode in which the injections of the fuel gas from the plurality of injectors are started substantially simultaneously and a third injection control mode in which the injections of the fuel gas from the plurality of injectors are started at shifted points of time, in such a manner that the second injection control mode and the third injection control mode can be switched depending on a circumstance.

In the control method of the fuel cell system above, in the first injection control mode, the fuel gas supply step may make the plurality of injectors intermittently inject the fuel gas in an alternate manner, once at a time.

In the control method of the fuel cell system above, in the second injection control mode, the fuel gas supply step may stop the injections of the fuel gas from the plurality of injectors substantially simultaneously.

In the control method of the fuel cell system above, in the third injection control mode, the fuel gas supply step may stop the injections of the fuel gas from the plurality of injectors at shifted points of time.

In the control method of the fuel cell system above, in the fuel gas supply step, and in the third injection control mode, from before to after a pause time of at least one of the injectors, another of the injectors may keep injecting the fuel gas.

According to the present invention, when the fuel cell is in the first load state, the first injection control mode is performed in which the plurality of injectors intermittently inject the fuel gas in an alternate manner, once at a time or multiple times at a time. Further, when the fuel cell is in the second load state in which the load is higher than in the first load state, it is possible to switch between the second injection control mode in which the injections of the fuel gas from the plurality of injectors are started substantially simultaneously and the third injection control mode in which the injections of the fuel gas from the plurality of injectors are started at shifted points of time. Consequently, it is possible to circulate the fuel off-gas stably to the fuel cell by a simple control, and, depending on the circumstances, to enhance the drainage efficiency of the produced water in the fuel cell while preventing a stoichiometric shortage of the fuel gas, or suppress noise and vibrations during operation of the injectors.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2A is an explanatory diagram showing a state in which a fuel gas is injected from a first injector, and FIG. 2B is an explanatory diagram showing a state in which the fuel gas is injected from a second injector;

FIG. 3 is a flowchart illustrating a control method of the fuel cell system of FIG. 1;

DESCRIPTION OF THE PREFERRED EMBODIMENTS

The fuel cell system and control method thereof according to the present invention will now be described in detail in conjunction with preferred embodiments with reference to the accompanying drawings.

Figure 1:
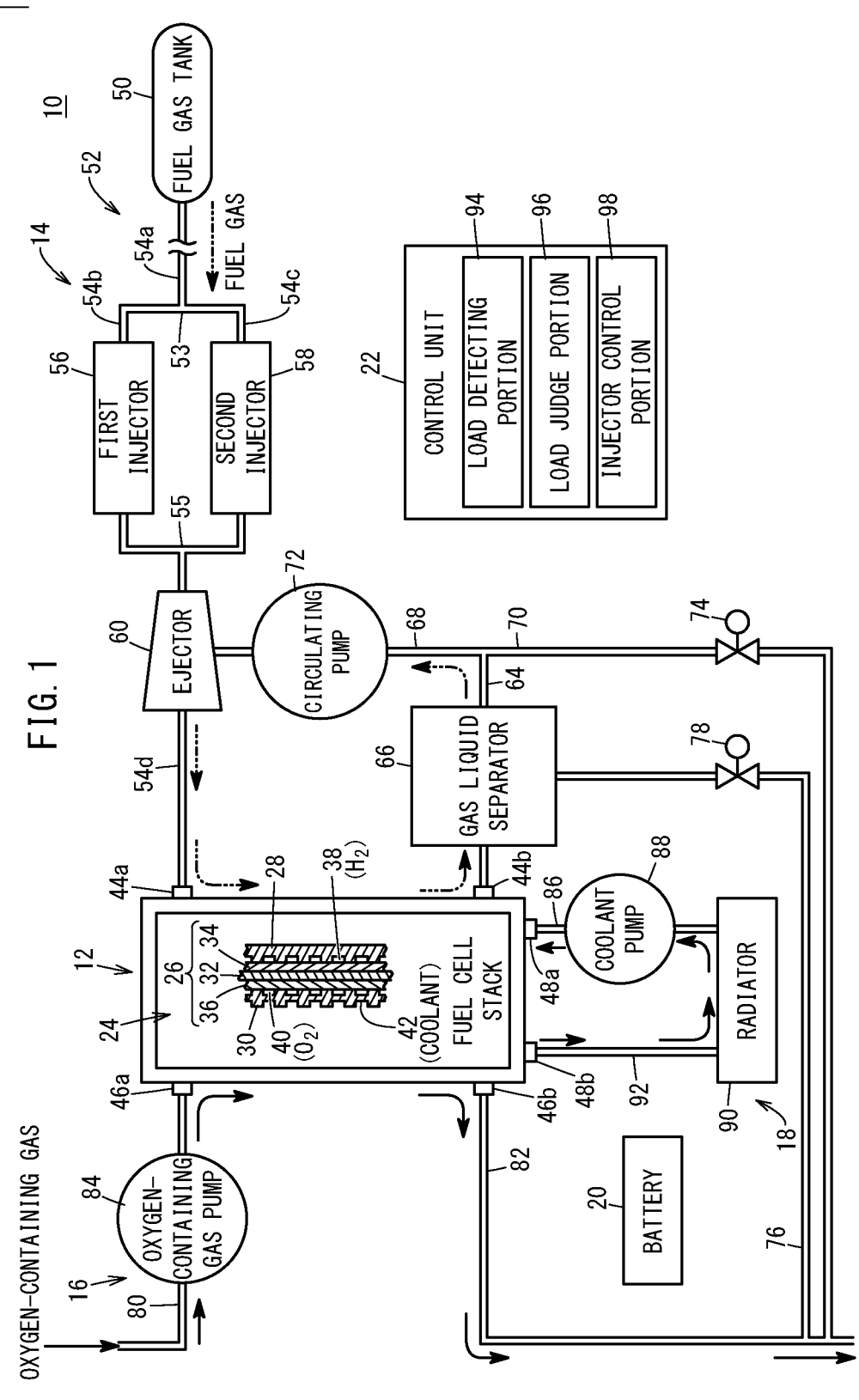
FIG. 1 is a schematic explanatory diagram showing the configuration of a fuel cell system according to an embodiment of the present invention.

As shown in FIG. 1, a fuel cell system 10 according to an embodiment of the present invention is mounted on a fuel cell vehicle (not shown) such as a fuel-cell electric car or the like, for example.

The fuel cell system 10 includes a fuel cell stack 12 (fuel cell). The fuel cell stack 12 is provided with a fuel gas supply device 14 for supplying a fuel gas, e.g. hydrogen gas, an oxygen-containing gas supply device 16 for supplying an oxygen-containing gas, e.g. the air, and a coolant supply device 18 for supplying a coolant. The fuel cell system 10 further includes a battery 20 as an energy storage device, and a control unit 22 as a system control device.

In the fuel cell stack 12, a plurality of power generation cells 24 are stacked in a horizontal direction or vertical direction. The power generation cell 24 includes a membrane electrode assembly 26 sandwiched between a first separator 28 and a second separator 30. The first separator 28 and the second separator 30 are made of a metal separator or carbon separator.

The membrane electrode assembly 26 includes a solid polymer electrolyte membrane 32 as a thin membrane of perfluorosulfonic acid containing water, for example, and an anode 34 and a cathode 36 holding the solid polymer electrolyte membrane 32 therebetween. The solid polymer electrolyte membrane 32 is made of a fluorine based electrolyte, or an HC (hydrocarbon) based electrolyte.

A fuel gas flow field 38 for guiding the fuel gas to the anode 34 is provided between the first separator 28 and the membrane electrode assembly 26. An oxygen-containing gas flow field 40 for supplying the oxygen-containing gas to the cathode 36 is provided between the second separator 30 and the membrane electrode assembly 26. A coolant flow field 42 for passing the coolant (cooling medium) is provided between mutually adjacent ones of the first separator 28 and second separator 30.

The fuel cell stack 12 has a fuel gas inlet 44a, a fuel gas outlet 44b, an oxygen-containing gas inlet 46a, an oxygen-containing gas outlet 46b, a coolant inlet 48a, and a coolant outlet 48b. The fuel gas inlet 44a passes through each power generation cell 24 in the stacking direction and communicates with the supply side of the fuel gas flow field 38. The fuel gas outlet 44b passes through each power generation cell 24 in the stacking direction and communicates with the discharge side of the fuel gas flow field 38. The fuel gas flow field 38, fuel gas inlet 44a, and fuel gas outlet 44b constitute an anode flow field.

The oxygen-containing gas inlet 46a passes through each power generation cell 24 in the stacking direction and communicates with the supply side of the oxygen-containing gas flow field 40. The oxygen-containing gas outlet 46b passes through each power generation cell 24 in the stacking direction and communicates with the discharge side of the oxygen-containing gas flow field 40. The oxygen-containing gas flow field 40, oxygen-containing gas inlet 46a, and oxygen-containing gas outlet 46b constitute a cathode flow field.

The coolant inlet 48a passes through each power generation cell 24 in the stacking direction and communicates with the supply side of the coolant flow field 42. The coolant outlet 48b passes through each power generation cell 24 in the stacking direction and communicates with the discharge side of the coolant flow field 42.

The fuel gas supply device 14 includes a fuel gas tank 50 storing a high-pressure fuel gas (high pressure hydrogen), and the fuel gas tank 50 communicates with the fuel gas inlet 44a of the fuel cell stack 12 through a fuel gas supply path 52. The fuel gas supply path 52 supplies the fuel gas to the fuel cell stack 12.

The fuel gas supply path 52 includes a first supply path 54a, a first branch path 54b, a second branch path 54c, and a second supply path 54d. The first supply path 54a has its upstream end connected to the fuel gas tank 50. The first supply path 54a has its downstream end connected to upstream ends (a branching portion 53) of the first branch path 54b and second branch path 54c. The first branch path 54b and second branch path 54c are disposed in parallel. The downstream end of the first branch path 54b and the downstream end of the second branch path 54c are connected together at a junction portion 55. The second supply path 54d has its upstream end connected to the downstream ends (the junction portion 55) of the first branch path 54b and second branch path 54c. The second supply path 54d has its downstream end connected to the fuel gas inlet 44a.

A first injector 56 is provided on the first branch path 54b, and a second injector 58 is provided on the second branch path 54c. The first injector 56 is an electronically controlled fuel injection device that is structured in a known manner, which injects downstream the fuel gas guided from the first supply path 54a to the first branch path 54b.

Though not graphically shown in detail, the first injector 56 includes a valve element for opening and closing a flow path formed in an injector body, and a coil (solenoid) for operating the valve element. The first injector 56 is opened as a current is passed to the coil, and is closed as the current to the coil is cut off. The second injector 58 is structured in substantially the same manner as the first injector 56. The second injector 58 injects downstream the fuel gas guided from the first supply path 54a to the second branch path 54c.

An ejector 60 is disposed on the second supply path 54d. In other words, the ejector 60 is provided at the junction portion 55. The ejector 60 generates a negative pressure by Venturi effect in the fuel gas guided from the junction portion 55 so as to draw in a fuel off-gas in a circulation flow path 68 which will be described later, mix the fuel off-gas with the fuel gas, and discharge it to the downstream side.

As shown in FIGS. 2A and 2B, the ejector 60 includes a hollow body 62a, a first connecting tube 62b, a second connecting tube 62c, a nozzle 62d, and a diffuser 62e. The first connecting tube 62b connects the body 62a and the junction portion 55. The second connecting tube 62c connects the body 62a and the circulation flow path 68. The nozzle 62d is provided to the body 62a in order to introduce the fuel gas, guided into the first connecting tube 62b, further into the body 62a. The diffuser 62e has an upstream opening portion facing to the nozzle 62d.

As shown in FIG. 1, a fuel gas discharge path 64 communicates with the fuel gas outlet 44b of the fuel cell stack 12. The fuel gas discharge path 64 discharges the fuel off-gas (fuel exhaust gas) from the fuel cell stack 12, where the fuel off-gas is the fuel gas which has at least partially been used at the anode 34. A gas-liquid separator 66 is disposed on the fuel gas discharge path 64.

The circulation flow path 68 and a purge flow path 70 are connected to a downstream end of the fuel gas discharge path 64. The circulation flow path 68 guides the fuel off-gas to the ejector 60. A circulating pump 72 is disposed on the circulation flow path 68. The circulating pump 72 causes the fuel off-gas discharged into the fuel gas discharge path 64 to circulate to the fuel gas supply path 52 through the circulation flow path 68, especially at the time of starting up.

A purge valve 74 is provided on the purge flow path 70. Connected to a bottom portion of the gas-liquid separator 66 is one end of a drainage flow path 76 for discharging fluid mainly containing liquid components. A drain valve 78 is provided on the drainage flow path 76.

The oxygen-containing gas supply device 16 includes an oxygen-containing gas supply path 80 communicating with the oxygen-containing gas inlet 46a of the fuel cell stack 12, and an oxygen-containing gas discharge path 82 communicating with the oxygen-containing gas outlet 46b of the fuel cell stack 12.

An oxygen-containing gas pump 84 for compressing and supplying an oxygen-containing gas (the air from the atmosphere) is provided on the oxygen-containing gas supply path 80. The oxygen-containing gas supply path 80 introduces the oxygen-containing gas into the fuel cell stack 12, and the oxygen-containing gas discharge path 82 discharges the exhaust oxygen-containing gas from the fuel cell stack 12, where the exhaust oxygen-containing gas is the oxygen-containing gas which has at least partially been used at the cathode 36.

The coolant supply device 18 includes a coolant supply path 86 connected to the coolant inlet 48a of the fuel cell stack 12. A coolant pump 88 is disposed on the coolant supply path 86. The coolant supply path 86 is connected to a radiator 90, and a coolant discharge path 92 communicating with the coolant outlet 48b is connected to the radiator 90.

The control unit 22 is a computer including a microcomputer, which is composed of a CPU (Central Processing Unit), ROM, RAM, and so on. The control unit 22 functions as a various functions realizing portion (function realizing means) as the CPU reads and executes programs stored in the ROM. The various functions realizing portion can also be constructed by using function realizing apparatus as hardware.

The control unit 22 controls the amount of power generation of the fuel cell stack 12 based on the power required by a load. The load includes, for example, a drive motor (not shown) and the like. The load may include the oxygen-containing gas pump 84, coolant pump 88, and the like.

The control unit 22 includes a load detecting portion 94, a load judge portion 96, and an injector control portion 98. The load detecting portion 94 detects the load of the fuel cell stack 12. The load judge portion 96 judges whether the load of the fuel cell stack 12 is in a first load state (low load state) or in a second load state (medium and high load state) in which the load is higher than in the first load state. The injector control portion 98 controls the first injector 56 and the second injector 58 (valve opening and closing). Specifically, the injector control portion 98 performs a first injection control mode when the fuel cell stack 12 is in the first load state. When the fuel cell stack 12 is in the second load state, the injector control portion 98 can switch between a second injection control mode and a third injection control mode, depending on the circumstances.

Operations of the fuel cell system 10 configured in this way will be described below.

Figure 5:
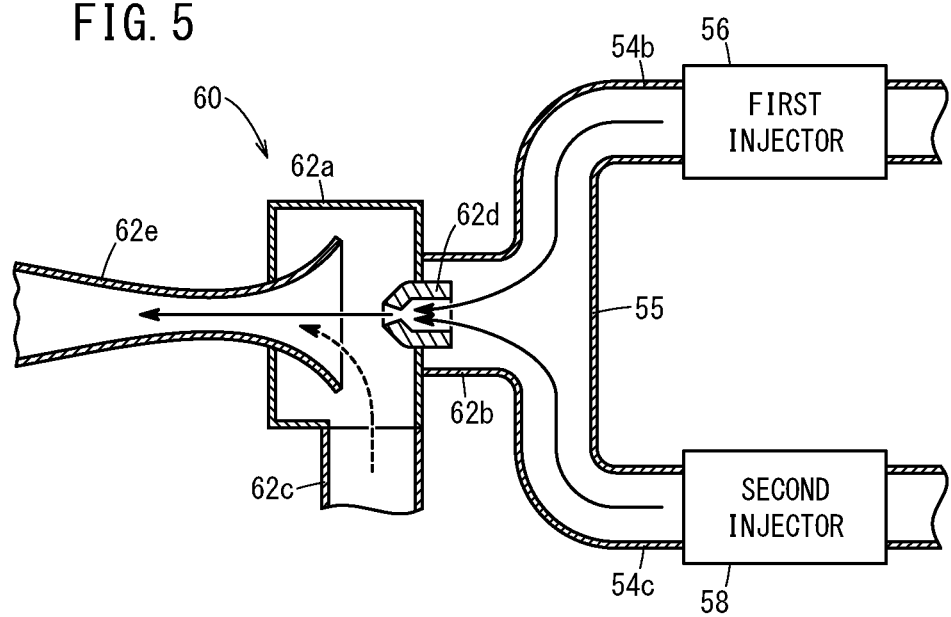
FIG. 5 is an explanatory diagram showing a state in which the fuel gas is simultaneously injected from the first injector and the second injector.

In the fuel gas supply device 14, the fuel gas is supplied from the fuel gas tank 50 to the first supply path 54a. At this time, the injector control portion 98 applies a valve opening control to at least one of the first injector 56 and second injector 58. The fuel gas injected from the first injector 56 is guided from the first branch path 54b to the junction portion 55 (see FIGS. 2A and 5). The fuel gas injected from the second injector 58 is guided from the second branch path 54c to the junction portion 55 (see FIGS. 2B and 5).

Then, the fuel gas guided to the junction portion 55 is discharged from the nozzle 62d into the diffuser 62e. The fuel gas discharged into the diffuser 62e is supplied to the fuel gas inlet 44a through the second supply path 54d. The fuel gas supplied to the fuel gas inlet 44a is introduced into the fuel gas flow field 38 and moves along the fuel gas flow field 38 to be supplied to the anode 34 of the membrane electrode assembly 26.

In the oxygen-containing gas supply device 16, the oxygen-containing gas is sent to the oxygen-containing gas supply path 80 under a rotation action of the oxygen-containing gas pump 84. The oxygen-containing gas is supplied to the oxygen-containing gas inlet 46a of the fuel cell stack 12. The oxygen-containing gas is introduced from the oxygen-containing gas inlet 46a into the oxygen-containing gas flow field 40, and moves along the oxygen-containing gas flow field 40 to be supplied to the cathode 36 of the membrane electrode assembly 26.

Thus, at each membrane electrode assembly 26, the fuel gas supplied to the anode 34 and the oxygen in the oxygen-containing gas supplied to the cathode 36 are consumed by electrochemical reactions in the electrode catalyst layers, so as to produce power. In this process, protons are generated at the anode 34, and the protons are conducted through the solid polymer electrolyte membrane 32 to move to the cathode 36. On the other hand, at the cathode 36, protons, electrons, and oxygen in the oxygen-containing gas produce water. The water thus produced (produced water) penetrate through the electrolyte membrane to reach the anode 34. The produced water is thus generated in the fuel cell stack 12 (anode flow field).

Further, in the coolant supply device 18, under the action of the coolant pump 88, the coolant, such as pure water, ethylene glycol, oil, or the like, is supplied from the coolant supply path 86 to the coolant inlet 48a of the fuel cell stack 12. The coolant flows along the coolant flow field 42, cools the power generation cell 24, and is discharged from the coolant outlet 48b to the coolant discharge path 92.

Next, the fuel gas supplied to the anode 34 and partially consumed is discharged as the fuel off-gas from the fuel gas outlet 44b to the fuel gas discharge path 64. The fuel off-gas flows from the fuel gas discharge path 64 to the circulation flow path 68, and is introduced into the second connecting tube 62c of the ejector 60. The fuel off-gas in the second connecting tube 62c is drawn into the ejector 60 by the action of the negative pressure generated as the fuel gas is discharged from the nozzle 62d into the diffuser 62e, and the fuel off-gas is mixed with the fuel gas (see FIGS. 2A, 2B and 5).

The fuel off-gas discharged to the fuel gas discharge path 64 is discharged (purged) under the releasing action of the purge valve 74 as needed. Similarly, the oxygen-containing gas supplied to the cathode 36 and partially consumed is discharged from the oxygen-containing gas outlet 46b into the oxygen-containing gas discharge path 82.

Next, a specific control method for the first injector 56 and the second injector 58 of the fuel cell system 10 will be described below referring to the flowchart of FIG. 3.

At step S1 (load detecting step) of FIG. 3, the load detecting portion 94 detects the load of the fuel cell stack 12. Specifically, the load detecting portion 94 detects an output power of the fuel cell stack 12, for example.

Subsequently, at step S2 (load judging step), the load judge portion 96 judges whether the load of the fuel cell stack 12 is in the first load state or the second load state. Specifically, the load judge portion 96 judges that the load is in the first load state (low load state) when the detected output power of the fuel cell stack 12 is equal to or lower than a threshold, and judges that it is in the second load state (medium and high load state) when the output power exceeds the threshold. Here, the threshold is set at 30% of the maximum output power of the fuel cell stack 12, for example. However, the threshold can be set arbitrarily. The threshold is stored in memory of the control unit 22 in advance.

However, the judgement of the load state of the fuel cell stack 12 by the load judge portion 96 can adopt any arbitrary method. For example, the load judge portion 96 may be configured to judge that the load is in the first load state when a vehicle speed or accelerator opening is at a certain value or lower, and to judge that the load is in the second load state when the vehicle speed or accelerator opening is larger than the certain value.

Figure 4:
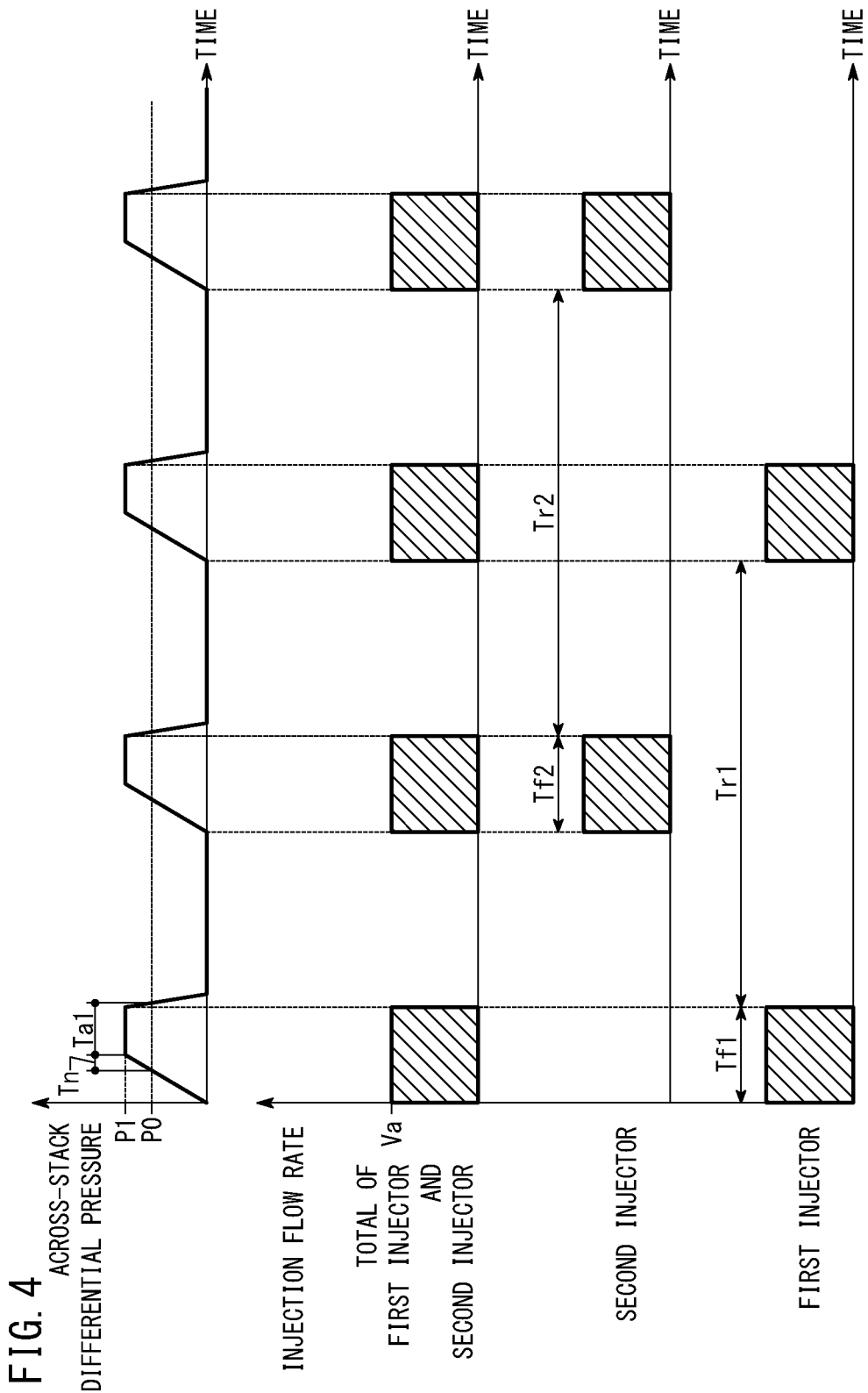
FIG. 4 is a graph illustrating a first injection control mode.

If at step S2 the load judge portion 96 judges that the load is in the first load state, then, at step S3 (fuel gas supply step), the injector control portion 98 controls the first injector 56 and the second injector 58 so as to perform the first injection control mode in which the first injector 56 and the second injector 58 intermittently inject the fuel gas in an alternate manner, each once at a time (see FIGS. 2A, 2B and 4).

As shown in FIG. 4, in the first injection control mode, an injection time Tf1 for which the first injector 56 injects the fuel gas at one time is substantially equal to an injection time Tf2 for which the second injector 58 injects the fuel gas at one time. The second injector 58 injects the fuel gas in a pause time Tr1 of the first injector 56 in which the fuel gas is not injected from the first injector 56. The first injector 56 injects the fuel gas in a pause time Tr2 of the second injector 58 in which the fuel gas is not injected from the second injector 58.

In this case, when the injection of the fuel gas from the first injector 56 is started, an across-stack differential pressure rises to reach a drainage lowest differential pressure P0. Here, the across-stack differential pressure means a difference between the pressure of the fuel gas at the fuel gas inlet 44a and the pressure of the fuel gas (fuel off-gas) at the fuel gas outlet 44b. The drainage lowest differential pressure means an across-stack differential pressure that is required to drain the produced water in the fuel cell stack 12 from the fuel gas outlet 44b.

When a given drainage necessary time Tn has elapsed after the across-stack pressure reached the drainage lowest differential pressure P0, drainage of the produced water in the fuel cell stack 12 is started. The across-stack pressure rises over the drainage lowest differential pressure P0 to reach a first drainage differential pressure P1. Subsequently, when the injection of the fuel gas from the first injector 56 is stopped, the across-stack differential pressure falls and the drainage of the produced water in the fuel cell stack 12 is stopped. That is, in the first injection control mode, the produced water in the fuel cell stack 12 is discharged during a first drainage time Ta1.

When the fuel gas is injected from the second injector 58, the across-stack differential pressure varies similarly to the across-stack differential pressure at the time when the fuel gas is injected from the first injector 56. An instantaneous injection flow rate Va (injection flow rate per unit time) of the first injector 56 and the second injector 58 is set to be such an instantaneous injection flow rate that the drainage necessary time Tn can be ensured even in the first load state (low load state) in which a relatively small amount of fuel gas is required. After the processing of step S3, the flowchart ends this time.

If, at step S2 of FIG. 3, the load judge portion 96 judges the load is in the second load state, then, at step S4, the control unit 22 determines whether there is a demand for quietness. Specifically, for example, the control unit 22 determines that there is a demand for quietness when the vehicle is parked or running at a given speed or lower, for example. However, the presence/absence of the demand for quietness can be determined by any arbitrary method. For example, the control unit 22 may judge there is a demand for quietness when a user gives an input with a given button or the like.

If the control unit 22 determines the absence of the demand for quietness (step S4: NO), then at step S5 (fuel gas supply step), the injector control portion 98 controls the first injector 56 and the second injector 58 so as to implement the second injection control mode in which the injection of the fuel gas from the first injector 56 and the injection of the fuel gas from the second injector 58 are started substantially simultaneously (see FIGS. 5 and 6).

Figure 6:
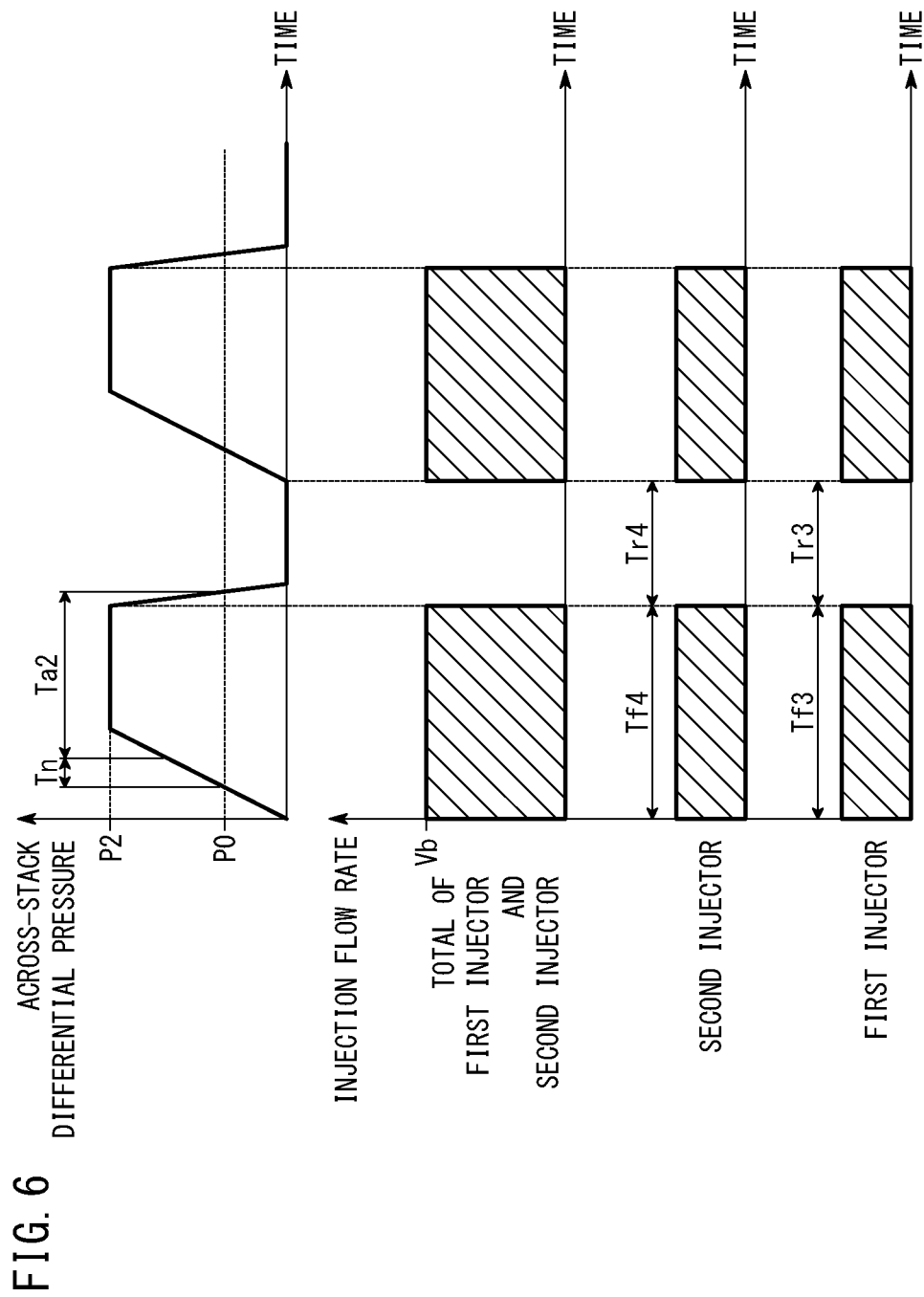
FIG. 6 is a graph illustrating a second injection control mode.

As shown in FIG. 6, in the second injection control mode, an injection time Tf3 for which the first injector 56 injects the fuel gas at one time is substantially equal to an injection time Tf4 for which the second injector 58 injects the fuel gas at one time. A total instantaneous injection flow rate Vb (pressure pulsation width) of the fuel gas injected from the first injector 56 and second injector 58 is larger than the instantaneous injection flow rate Va (pressure pulsation width) in the first injection control mode.

In the second injection control mode, the injector control portion 98 substantially simultaneously stops the injections of the fuel gas from the first injector 56 and the second injector 58. A pause time Tr3 of the first injector is substantially equal to a pause time Tr4 of the second injector 58.

In this case, when the injections of the fuel gas from the first injector 56 and the second injector 58 are started substantially simultaneously, the across-stack differential voltage rises to reach the drainage lowest differential pressure P0. When the given drainage necessary time Tn has passed after the across-stack differential pressure reached the drainage lowest differential pressure P0, drainage of the produced water in the fuel cell stack 12 is started. The across-stack differential pressure further rises over the drainage lowest differential pressure P0 to reach a second drainage differential pressure P2. The second drainage differential pressure P2 is larger than the first drainage differential pressure P1 in the first injection control mode (see FIG. 4).

Then, when the injections of the fuel gas from the first injector 56 and the second injector 58 are stopped at substantially the same time, the across-stack differential pressure falls and the drainage of the produced water in the fuel cell stack 12 is stopped. That is, in the second injection control mode, the produced water in the fuel cell stack 12 is drained during a second drainage time Ta2. After the processing of step S5, the flowchart ends this time.

If the control unit 22 judges that there is a demand for quietness (step S4: YES), then at step S6 (fuel gas supply step), the injector control portion 98 controls the first injector 56 and the second injector 58 so as to implement the third injection control mode in which the injection of the fuel gas from the first injector 56 and the injection of the fuel gas from the second injector 58 are started at shifted points of time (see FIG. 7).

Figure 7:
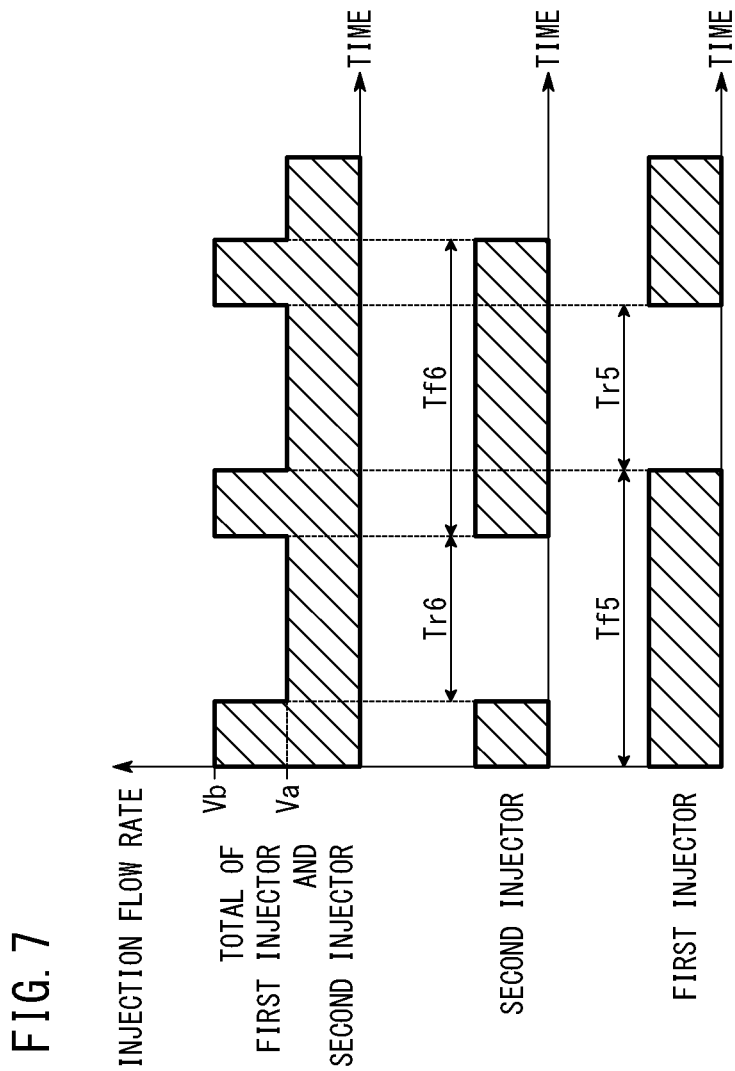
FIG. 7 is a graph illustrating a third injection control mode.

As shown in FIG. 7, in the third injection control mode, an injection time Tf5 for which the first injector 56 injects the fuel gas at one time is substantially equal to an injection time Tf6 for which the second injector 58 injects the fuel gas at one time. The injection times Tf5, Tf6 in the third injection control mode are longer than the injection times Tf1, Tf2 in the first injection control mode (see FIG. 4). In the third injection control mode, a pause time Tr5 of the first injector 56 is substantially equal to a pause time Tr6 of the second injector 58.

In the third injection control mode, the injector control portion 98 stops the injections of the fuel gas from the first injector 56 and the second injector 58 at shifted points of time. The second injector 58 keeps injecting the fuel gas from before to after the pause time Tr5 of the first injector 56. The first injector 56 keeps injecting the fuel gas from before to after the pause time Tr6 of the second injector 58.

The time for which the fuel gas is injected from both of the first injector 56 and second injector 58 (the time of the total instantaneous injection flow rate Vb) is shorter than the time for which the fuel gas is injected from only one of the first injector 56 and second injector 58 (the time of the instantaneous injection flow rate Va). However, the time for which the fuel gas is injected from both of the first injector 56 and second injector 58 may be equal to or longer than the time for which the fuel gas is injected from only one of the first injector 56 and second injector 58.

In this case, the pressure pulsation width of the fuel gas in the third injection control mode (the total instantaneous injection flow rate Vb−the instantaneous injection flow rate Va) is smaller than the pressure pulsation width (total instantaneous injection flow rate Vb) of the fuel gas in the second injection control mode. After the processing of step S6, the flowchart ends this time.

The fuel cell system 10 and control method thereof according to this embodiment offers the following effects.

The fuel gas injected from the first injector 56 and the second injector 58 is guided to the diffuser 62*e* through the nozzle 62*d* of the ejector 60. Accordingly, the circulation characteristics of the fuel off-gas can be made substantially equal irrespective of from which of the first injector 56 and the second injector 58 the fuel gas is injected. It is thus possible to stably circulate the fuel off-gas to the fuel cell stack 12 by a simple control.

When the fuel cell stack 12 has the first load, the injector control portion 98 controls the first injector 56 and the second injector 58 so as to implement the first injection control mode in which the first injector 56 and the second injector 58 intermittently inject the fuel gas in an alternate manner, once at a time. Accordingly, even in the first load state in which the amount of necessary fuel gas is relatively small, the injection time for which the first injector 56 and the second injector 58 inject the fuel gas at one time can be equal to or longer than the drainage necessary time. This makes it possible to efficiently drain the produced water in the fuel cell stack 12. Further, it is possible to suppress variation between the numbers of times that the first injector 56 and the second injector 58 inject the fuel gas, and the lifetimes of the first injector 56 and the second injector 58 can be made equal to each other.

When the fuel cell stack 12 is in the second load state, the injector control portion 98 can perform the second injection control mode in which the injections of the fuel gas from the first injector 56 and the second injector 58 are started substantially simultaneously. In this case, the pressure pulsation width of the fuel gas can be relatively large, so that the across-stack differential pressure can be made high efficiently. Consequently, it is possible to enhance the drainage efficiency of the produced water in the fuel cell stack 12 while preventing a stoichiometric shortage of the fuel gas.

When the fuel cell stack 12 is in the second load state, the injector control portion 98 can perform the third injection control mode in which the injections of the fuel gas from the first injector 56 and the second injector 58 are started at shifted points of time. In this case, the pressure pulsation width of the fuel gas can be smaller than in the second injection control mode, so that noise and vibrations during operation of the first injector 56 and the second injector 58 can be reduced.

In the second injection control mode, the injector control portion 98 stops the injections of the fuel gas from the first injector 56 and the second injector 58 substantially simultaneously. The time period in which the first injector 56 and the second injector 58 simultaneously inject the fuel gas can then be relatively long, making it possible to further prevent a stoichiometric shortage of the fuel gas.

In the third injection control mode, the injector control portion 98 stops the injections from the first injector 56 and the second injector 58 at shifted points of time. This further reduces noise and vibrations during operation of the first injector 56 and the second injector 58.

In the third injection control mode, the injector control portion 98 provides control such that the second injector 58 injects the fuel gas from before to after the pause time Tr5 of the first injector 56, and the first injector 56 injects the fuel gas from before to after the pause time Tr6 of the second injector 58. This prevents a stoichiometric shortage of the fuel gas.

In each of the first to third injection control modes, the injector control portion 98 controls the first injector 56 and the second injector 58 such that the injection time Tf1, Tf3, Tf5, for which the first injector 56 injects the fuel gas at one time, is substantially equal to the injection time Tf2, Tf4, Tf6 for which the second injector 58 injects the fuel gas at one time. This makes it possible to stably circulate the fuel off-gas to the fuel cell stack 12 by a further simpler control.

The first injector 56 and the second injector 58 are structured in substantially the same manner. This makes it possible to stably circulate the fuel off-gas to the fuel cell stack 12 by a still simpler control.

The present invention is not limited to the configurations and methods described above. In the first injection control mode, the injector control portion 98 may provide control such that the first injector 56 and the second injector 58 intermittently inject the fuel gas in an alternate manner, multiple times at a time. The fuel cell system 10 may include three or more injectors disposed in parallel on the fuel gas supply path 52.

The fuel cell system and its control method according to the present invention are not limited to the above-described embodiments and can of course take various configurations and methods without departing from the scope of the present invention.

What is claimed is:
1. A fuel cell system comprising:
    a fuel cell for producing power by an electrochemical reaction between a fuel gas and an oxygen-containing gas;
    a fuel gas supply path for guiding the fuel gas to the fuel cell;
    a plurality of injectors disposed in parallel on the fuel gas supply path, the fuel gas supply path having a first branch in fluid communication with a first injector from the plurality of injectors and a second branch in fluid communication with a second injector from the plurality of injectors;
    one ejector disposed downstream of the plurality of injectors on the fuel gas supply path, the one ejector in fluid communication with the first branch and the second branch;

a circulation flow path for guiding a fuel off-gas discharged from the fuel cell to the ejector,
the ejector comprising:
a diffuser; and
a nozzle for guiding the fuel gas injected from the plurality of injectors to the diffuser, and
a processor programmed to:
judge whether the fuel cell is in a first load state or in a second load state in which a load is higher than in the first load state; and
control the plurality of injectors,
wherein, when the fuel cell is in the first load state, the processor is programmed to control the plurality of injectors so as to perform a first injection control mode in which the plurality of injectors intermittently inject the fuel gas in an alternate manner, once per injector or multiple times per injector, and
when the fuel cell is in the second load state, the injector control portion controls the plurality of injectors in a manner switchable between a second injection control mode in which injections of the fuel gas from the plurality of injectors are started simultaneously and a third injection control mode in which the injections of the fuel gas from the plurality of injectors are started at shifted points of time.

2. The fuel cell system according to claim 1, wherein the processor is programed to control the plurality of injectors such that, in the first injection control mode, the plurality of injectors intermittently inject the fuel gas in an alternate manner, once per injector.

3. The fuel cell system according to claim 1, wherein processor is programed to control the plurality of injectors so as to, in the second injection control mode, stop the injections of the fuel gas from the plurality of injectors simultaneously.

4. The fuel cell system according to claim 1, wherein the processor is programed to control the plurality of injectors so as to, in the third injection control mode, stop the injections of the fuel gas from the plurality of injectors at shifted points of time.

5. The fuel cell system according to claim 1, wherein the processor is programed to control the plurality of injectors such that, in the third injection control mode, from before to after a pause time of at least one of the injectors, another of the injectors keeps injecting the fuel gas.

6. The fuel cell system according to claim 1, wherein the processor is programed to control the plurality of injectors such that, in each of the first to third injection control modes, injection times during which each of the injectors injects the fuel gas at one time are equal to each other.

7. The fuel cell system according to claim 1, wherein the plurality of injectors are structured in a identical manner.

8. The fuel cell system according to claim 1, wherein the first branch and the second branch have their downstream end portions connected together at a junction portion, and
the ejector is provided at the junction portion.

* * * * *